United States Patent [19]
Forsythe

[11] Patent Number: 5,215,615
[45] Date of Patent: Jun. 1, 1993

[54] PROCESS FOR MULTIPLE YARN WINDING IN ORDERED FASHION AND RESULTING PRODUCT

[75] Inventor: George D. Forsythe, Landenberg, Pa.

[73] Assignee: E. I. du pont de Nemours and Company, Wilmington, Del.

[21] Appl. No.: 892,144

[22] Filed: Jun. 5, 1992

Related U.S. Application Data

[63] Continuation of Ser. No. 631,435, Dec. 21, 1990.

[51] Int. Cl.⁵ .................. B65H 55/04; F01N 3/02
[52] U.S. Cl. ........................ 156/169; 156/172; 156/175; 55/527; 242/178; 502/439
[58] Field of Search ............ 156/175, 174, 173, 169, 156/172; 242/178, 176, 174, 159; 55/527, 520, 515, 516, DIG. 5, DIG. 32; 210/494.1, 497.1, 497.2; 502/439

[56] References Cited

U.S. PATENT DOCUMENTS

| | | | |
|---|---|---|---|
| 480,158 | 8/1892 | Wardwell | 242/178 |
| 1,751,000 | 3/1930 | Goldman | 210/494.1 |
| 2,150,309 | 3/1939 | Atwell | 242/178 |
| 2,843,153 | 6/1958 | Young | 156/320 |
| 3,065,856 | 11/1962 | Goldman | 210/494.1 |
| 3,356,226 | 12/1967 | Miller | 210/497.1 |
| 3,398,837 | 8/1968 | Adams | 55/527 |
| 3,645,833 | 2/1972 | Figge . | |
| 3,949,109 | 4/1976 | McBride . | |
| 3,986,528 | 10/1976 | Green | 138/177 |
| 3,989,471 | 11/1976 | Nowak . | |
| 4,092,194 | 5/1978 | Green | 156/89 |
| 4,205,971 | 6/1980 | Abthoff et al. | 55/330 |
| 4,385,952 | 5/1983 | Fatakuchi et al. | 156/174 |
| 4,509,702 | 4/1985 | Reese | 242/18 G |
| 4,761,323 | 8/1988 | Muhlratzer et al. | 428/198 |
| 4,878,984 | 11/1989 | Bourrieres | 156/430 |
| 4,923,487 | 5/1990 | Bogart et al. | 55/482 |
| 4,925,463 | 5/1990 | Kuhnert | 55/96 |
| 4,962,487 | 2/1990 | Cooper et al. | 423/215.5 |

FOREIGN PATENT DOCUMENTS

| | | |
|---|---|---|
| 0358522 | 3/1990 | European Pat. Off. . |
| 2125572 | 1/1972 | Fed. Rep. of Germany ........ 55/527 |
| 63-92441 | 4/1988 | Japan ................ 156/175 |
| 0003177 | of 1884 | United Kingdom ............... 242/174 |

OTHER PUBLICATIONS

Filterite Corporation Bulletin C-1, 1965.

Primary Examiner—Michael W. Ball
Assistant Examiner—Daniel J. Stemmer

[57] ABSTRACT

A process for forming a tubular wound package suitable for use as the fibrous support for a catalytic converter is disclosed. The process involves winding two yarns on a support using two separate yarn guides to form a series of walls defining both outwardly and inwardly facing pyramids.

8 Claims, 5 Drawing Sheets

FIG.2A   FIG.2B
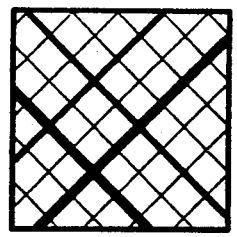 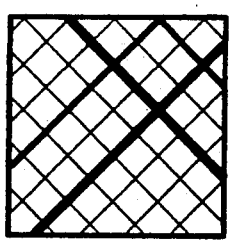
STAGE 1
BEGINNING OF PACKAGE FORMATION
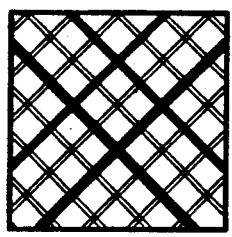 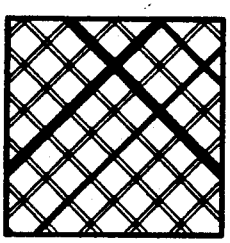
STAGE 2
NEAR START OF PACKAGE FORMATION
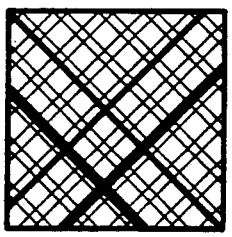 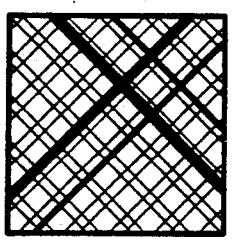
STAGE 3
APPROACHING MIDDLE OF PACKAGE FORMATION
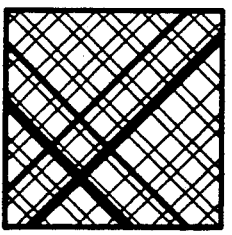 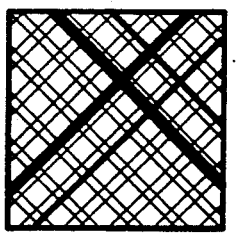
STAGE 4
PAST MIDDLE OF PACKAGE FORMATION
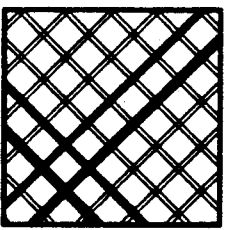 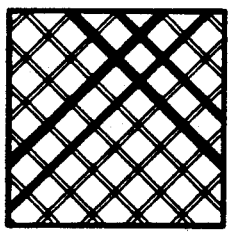
STAGE 5
NEAR END OF PACKAGE FORMATION
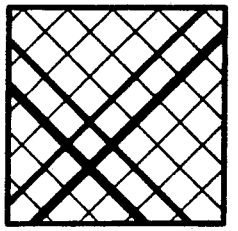 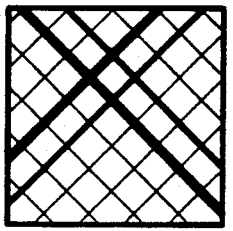
STAGE 6
COMPLETION OF PACKAGE FORMATION

STAGE 1

BEGINNING OF
PACKAGE FORMATION

STAGE 2

NEAR START OF
PACKAGE FORMATION
1-1/9X STARTING DIAMETER

STAGE 3

APPROACHING MIDDLE
OF PACKAGE FORMATION
1-1/4X STARTING DIAMETER

STAGE 4

PAST MIDDLE OF
PACKAGE FORMATION
1-4/7X STARTING DIAMETER

STAGE 5

NEAR END OF
PACKAGE FORMATION
1-2/3X STARTING DIAMETER

STAGE 6

COMPLETION OF
PACKAGE FORMATION
2X STARTING DIAMETER

PROCESS FOR MULTIPLE YARN WINDING IN ORDERED FASHION AND RESULTING PRODUCT

This is a continuation of application Ser. No. 07/631,435 filed Dec. 21, 1990, now abandoned.

FIELD OF THE INVENTION

The present invention involves a process for winding two yarns on a rotating mandrel wherein a traverse holder for two yarn guides is moved in reciprocating fashion back and forth along the length of the rotating mandrel to lay down a pattern of yarn on the mandrel which forms a series of truncated pyramids having major openings facing the outside of the product wound structure and a complimentary series of truncated pyramids having major openings facing the interior of the product wound structure. The yarns may be highly refractory and the product is generally tubular in shape and is coated with a ceramic binder, which in turn is impregnated with a catalyst to provide a catalytic reactor such as those used as catalytic converters to reduce emissions from motor vehicles.

BACKGROUND OF THE INVENTION

There have been two general approaches to making catalytic exhaust converters for automobiles and other motor vehicles. One has involved the use of a loose bed of ceramic pellets as a carrier for the catalyst, and the other has involved the use of rigid ceramic elements as the catalyst carrier. The bed of ceramic pellets has the disadvantage of attrition of the pellets due to self-abrasion so that the bed has to be replaced at relatively frequent intervals, while the use of rigid ceramic carriers has the disadvantage of inadequate resistance to thermal shock and to mechanical shock.

More recently the rigid type of ceramic carriers have been made from retriculated tubes of reinforced ceramic fibers which provide adequate resistance to both thermal shock and mechanical shock.

U.S. Pat. No. 4,092,194 and U.S. Pat. No. 3,986,528 disclose a reticulated tube of reinforced ceramic fibers suitable for use as a catalyst carrier for use in the catalytic conversion of internal combustion engine exhaust fumes. The tube is comprised of multiple layers of continuous yarn of ceramic fibers bonded, if desired, with a non-porous binder and contained in a refractory oxide matric suitable for use as a catalyst support.

U.S. Pat. No. 3,949,109 discloses a catalyst for use in fixed bed flow reactors comprising a porous, self-supporting structure of multiple layers of partially sintered glass-ceramic fibers. The structure preferably is tubular and has diamond shaped apertures in its walls to provide good fluid permeability. When coated with a catalyst, the structures are particularly useful in the catalytic conversion of pollutants in the exhaust fumes of internal combustion engines.

U.S. Pat. No. 3,645,833 discloses a quasi-isotropic sandwich-type structural core filament winding made on a jig on which the filaments ar interwoven in a manner where each fiber lays on top of the preceding fiber so that when the winding is completed, a core is produced which consists of a series of tetrahedrons, half of which point upwards and half point downwards. The jig may be of varied shapes so that the core is flat, cylindrical, air foil or other irregular shapes.

U.S. Pat. No. 4,509,702 discloses an apparatus method and package for winding strands to achieve good split efficiency on removal of the plurality of strands from the package for further processing. The apparatus has fiber forming means, means for applying chemicals such as lubricants or binders to the fibers, means to gather the fibers into a plurality of strands, a rotatable winder to wind the strands and a slotted traversing guide. The traversing guide has more than one slot to guide the strands. The slots are disposed perpendicularly to the axis of rotation of the winder.

SUMMARY OF THE INVENTION

The present invention relates to a process for winding two yarns on a rotating mandrel to form a tubular structure for contacting gases comprising a plurality of truncated pyramids facing outwardly the walls of which also form a plurality of truncated pyramids facing inwardly. The yarns are wound on the mandrel from two yarn holders which reciprocate back and forth in a direction parallel to the axis of rotation of the mandrel to provide a buildup of yarn on the mandrel forming the truncated pyramids.

BRIEF DESCRIPTION OF THE DRAWINGS

FIG. 2A is a series of depictions of the yarn laydown patterns formed on the surface of the mandrel as winding progresses using the yarn guide arrangement schematically illustrated in FIG. 1B.

FIG. 2B is a series of depictions of the yarn laydown patterns formed on the surface of the mandrel as winding progresses using the yarn guide arrangement schematically illustrated in FIG. 1C.

DETAILED DESCRIPTION OF THE DRAWINGS

FIG. 1 depicts a greatly simplified schematic of a winder suitable for practice of this invention. As can be seen in FIG. 1A, the mandrel (chuck) upon which the package will be wound is mounted upon a rotating shaft. One or more traverse holders (B, b, etc.) are mounted in such a fashion that they may be moved in a reciprocating motion, the main component of which is parallel to the rotational axis of the chuck. These traverses are suitably driven in relationship to the chuck shaft rotation such that the rotation of the chuck shaft makes a fixed small rational number of turns per each complete reciprocation of the traverses. A complete reciprocation shall be considered as starting at any point in the motion and reaching both extremes of endwise position, then returning to the starting position. All such traverse holders undergo motion at the same ratio and essentially in phase compared to each other. In addition to this major motion, one or both of the traverse holders may be capable of controlled slow motion independent of this, as described below. There are, preferably, two such traverse holders at most, and in certain configurations, one will suffice, provided it shall have at least two separate yarn guides mounted on it which may be capable of the controlled slow independent motion described above.

Figure 1A:
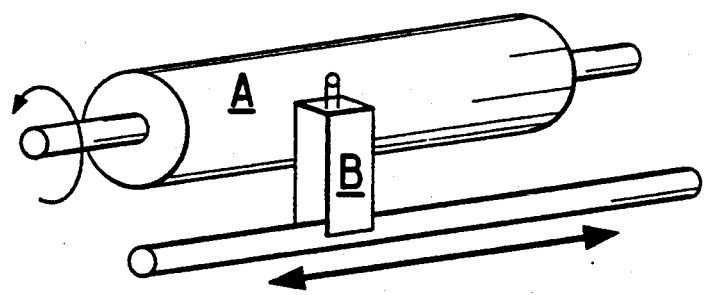
FIG. 1A is a schematic of a winding mandrel and yarn holder for use in the present invention.
Figure 1B:
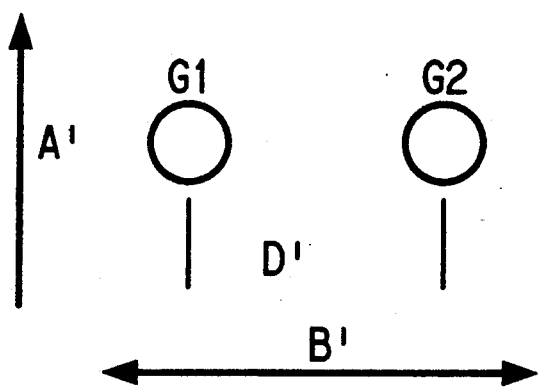
FIG. 1B is a schematic of an arrangement of two yarn guides in relation to the movement of the surface of the winding mandrel.
Figure 1C:
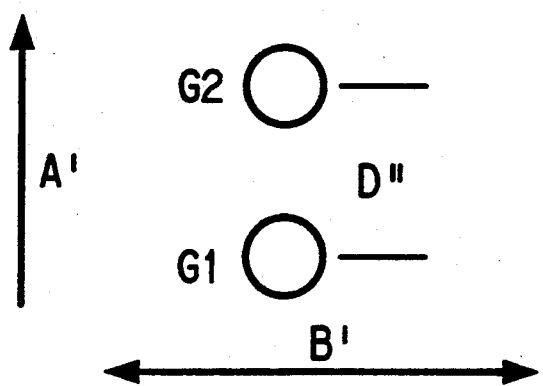
FIG. 1C is a schematic of an alternate arrangement of two yarn guides in relation to the movement of the surface of the winding mandrel.

FIG. 1B and FIG. 1C show desirable arrangements of the yarn guides G1 and G2 with guides 61 and 62 being in a horizontal plane with respect to motion B' and in a vertical plane with respect to motion B' as shown in FIGS. 1B and 1C, respectively. In both these figures, the motion B' represents the horizontal reciprocation of the traverse holders, and the motion A' represents the passage of the surface of the wound package on the mandrel closest to the yarn guides past the yarn guides. This motion (A') may be either as shown or in the reverse direction. Note that the separation of the yarn guides as shown by the distances D' and D" is the separation as projected on the surface of the package. The "controlled slow independent motion" described above is capable of altering these distances if desired as the package is being wound.

Figure 1D:
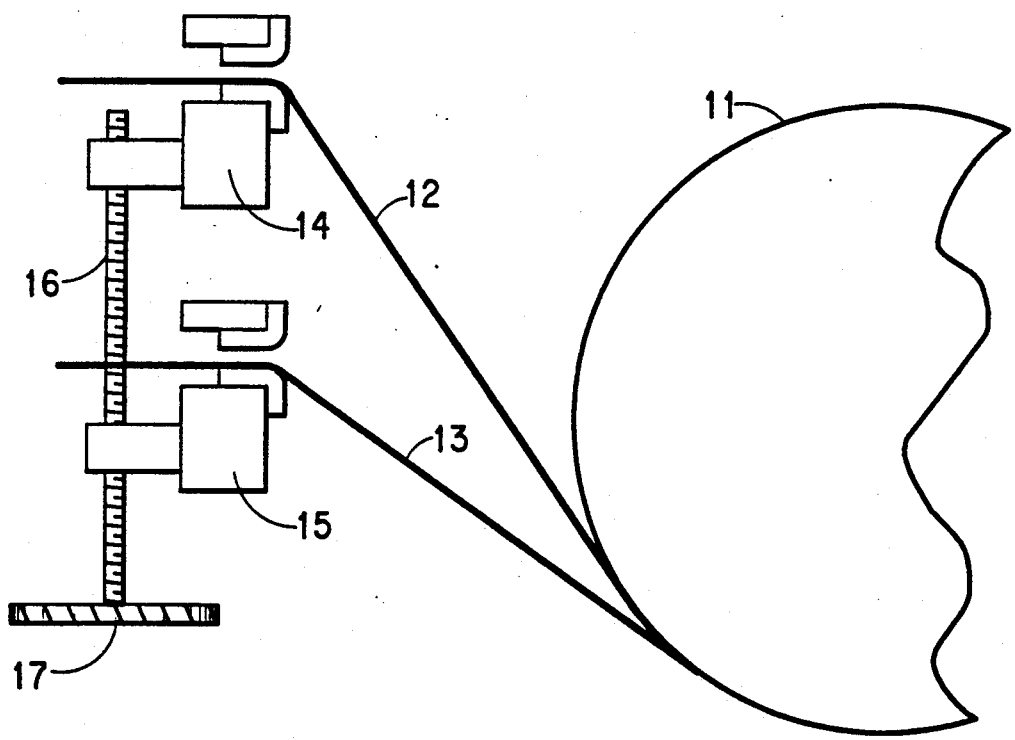
FIG. 1D depicts the winding mandrel and yarn guides for use in the present invention.

FIG. 1D shows mandrel 11 winding up yarns 12 and 13 which are passing over yarn guides 14 and 15 one above the other in a vertical plane. Yarn guides 14 and 15 are urged back and forth by screw thread 16 driven by wheel 17 which in turn is rotated by suitable means, not shown, such as a sprocket chain or the like.

In practice, the "fixed small rational number of turns per each complete reciprocation of the traverses" specified for the chuck rotation guarantees that in most instances, yarns being carried by the traverse yarn guides will return to exactly overlay itself after a small number of chuck rotations, without having completely covered the surface of the package with a layer of yarn. This results in a package wherein the yarn forms a series of diamond like openings covering the surface of the winding layer. Such "diamonds" and the desirable relationship of the distances D' and D" to them are illustrated in FIG. 2.

FIG. 2 shows a depiction of the patterns formed on the package surface by the last completed yarn layer. This layer is formed by two separate yarns carried by two separate yarn guides. The small figures in column A depict the results of yarn guide separation as shown in FIG. 1C and in column B the results of yarn guide separation as shown in FIG. 1B. In all cases, the yarn deposited by the last single complete reciprocation of the primary yarn guide (G1) of the pair is most heavily highlighted. The yarn deposited by the last single complete reciprocation of the secondary yarn guide (G2) is highlighted less heavily. Any distortion of the pattern which occurs as the package builds is overlooked for reasons of simplification as it does not alter the effect desired. In the pair of small figures shown opposite the caption of Stage 1, the distance separating the highlighted yarns is shown as an even multiple of the pattern unit spacing (in this case 2×  but other multiples such as 3× or 4× are also acceptable). As the package builds through the stages to completion, change of the distances D' and D" relative to the pattern unit spacing (in both cases shown, it decreases to 1× but, in general, it goes to 1× less than the starting separation) causes an apparent breakup of the pattern and the eventual return to a state very similar to the appearance in stage 1. Since the stacked yarns lain down by these two guides create a wall, the effective result is the closure of all of the openings present at start and creation of a new set present at finish as well as a set present only during the winding but closed off at both start and finish. Note that in both column A and B, the effective result is essentially the same. Only at the ends of the package will any major difference be detected.

Figure 3A:
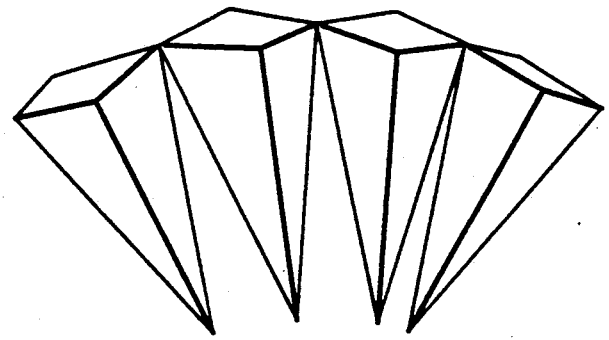
FIG. 3A depicts the pyramids formed by the invention with the major openings on the outside of the wound product.
Figure 3B:
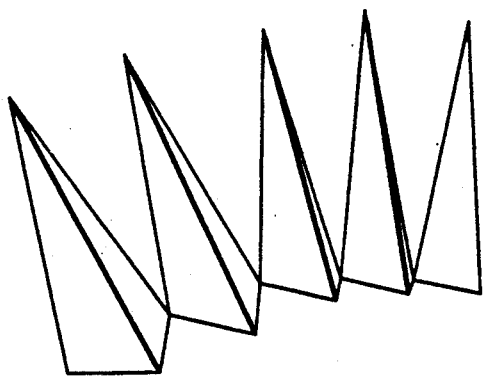
FIG. 3B depicts the pyramids formed by the invention with the major openings on the inside of the wound product.
Figure 3C:
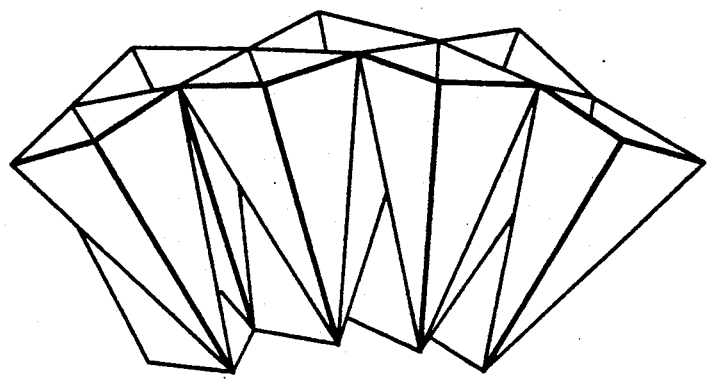
FIG. 3C depicts the internal wall voids formed between the inside opening pyramids and outside opening pyramids of the wound product produced by the process of the present invention.

FIG. 3 shoes a simplified perspective drawing of the volume elements present in the package wall. FIG. 3A shows some of the set of pyramids open to the final surface of the unit, but not present at the start of the winding. FIG. 3B shows some of the set of pyramids open to the initial surface of the unit, but not present at the finish of the winding. In FIG. 3C may be seen a depiction of some of both these sets of pyramids, nested as they are in the package wall. The volume excluded from both these sets of elements forms the intra-wall voids open to neither inside or outside surface.

Figure 4:
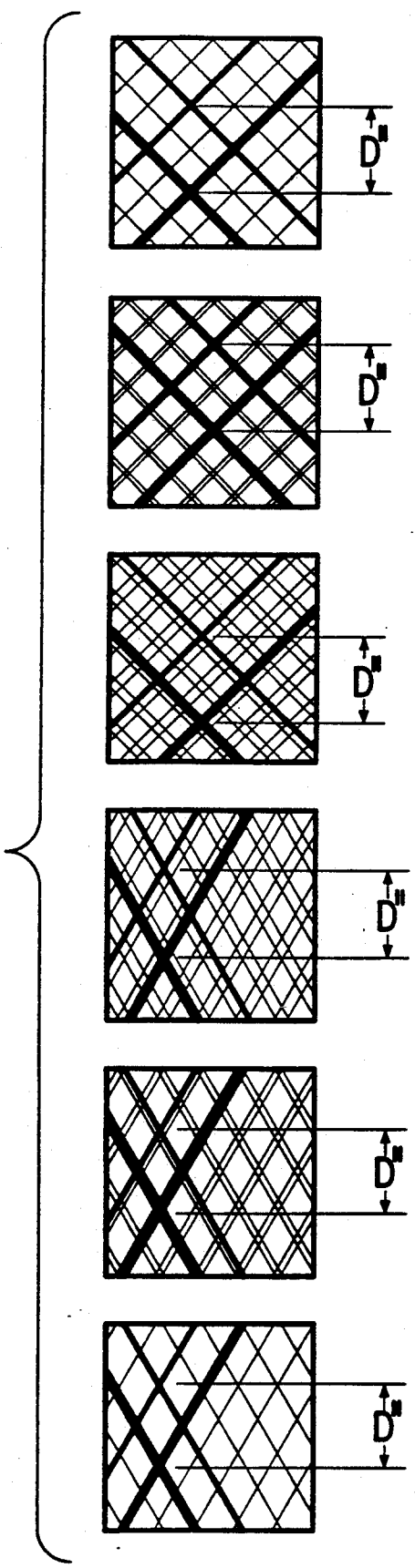
FIG. 4 is a series of depictions of the yarn laydown patterns formed on the surface of the mandrel as winding progresses using the yarn guide arrangement schematically illustrated in FIG. 1B when distance D" remains constant throughout the winding process.

FIG. 4 represents a special case with the yarn guides arranged as in FIG. 1C. In this case, the distortion of the pattern which occurs as the package builds and which was overlooked for reasons of simplification above, is used to advantage to eliminate the necessity for changing distance D". As mentioned above, the fixed ratio of chuck revolutions to traverse reciprocations gives a diamond pattern in the package. This pattern has a fixed number of diamonds at all times for any given ratio, and the dimensions of the diamonds constantly change as the diameter of the package increases. The small figures show the relative change of diamond dimensions as the package diameter doubles from inside to outside. In all these figures, the conventions of highlighting are those used in FIG. 2 and the package is shown at equivalent stages with the appropriate relative diameters indicated. In addition, there is included a scale bar to show that the size of distance D" is constant and only the relative size compared to the pattern dimensions is changing. The net effect of this relative change is the same as if a real distance change had occurred.

When forming a support for a catalytic converter for reducing the pollutants contained in exhaust fumes from internal combustion engines, the fibers used herein are ceramic and sufficiently refractory so that yarns thereof do not sag or soften at temperatures below about 750° C., preferably 1000° C.

Suitable such fibers include certain glass fibers such as S glass (high tensile strength glass containing about 24–26% of $Al_2O_3$), "Fiber Fax" and polycrystalline refractory oxide fibers containing more than about 20% by weight $Al_2O_3$ such as the alumina-silica fibers disclosed in U.S. Pat. No. 3,503,765 and certain of the high alumina content fibers disclosed in U.S. Pat. No. 3,808,015 and U.S. Pat. No. 3,853,688. Preferably the fibers contain at least 70 weight percent $Al_2O_3$. Most preferably, the fibers are substantially alumina. The ceramic fibers generally have diameters in the range of 0.2 to 2.0 mils ($0.5-5 \times 10^{-5}$M).

A fiber of a refractory oxide precursor can be used in the winding process of the present invention. These precursor fibers are then converted to polycrystalline refractory oxide fibers by firing to remove volatile matter, change salts to oxides and crystallize the fiber. The preparation of refractory oxide fibers and their precursors is disclosed in U.S. Pat. Nos. 3,808,015 and 3,853,688.

The fibers retain their discrete fibrous form in the product package and are used in the form of yarns, preferably containing 10 to 2,000 or more continuous fibers. Yarns of staple fibers can be used, especially glass. Yarns are not readily made from refractory oxide staple fibers by normal methods, but composite yarns containing short length fibers and a binder or matrix can be used.

A non-porous ceramic binder, when used, serves (1) as a processing aid to hold the yarns in the wound package in place for application of the matrix material and/or (2) to provide additional strength and erosion resistance in the final product. The binders must be of low enough viscosity at firing temperatures to at least partially flow around the ceramic fibers, but of a high enough viscosity not to flow off the yarn structure.

Glasses or crystalline ceramic binders that soften or sinter at temperatures at least 50° C. below the sag temperature of the yarn of ceramic fibers can be used in the form of frits, or, more preferably, the binders may be in the form of a fiber or yarn. The use of a binder in yarn or fiber form affords uniform distribution of the binder throughout the structure and simplifies application because use of a binder in fiber form permits it to be joined with the ceramic fiber which forms the wound package prior to winding on bobbins. Siliceous glasses for this purpose generally contain from 40 to 80 wt % of $SiO_2$ and the preferred siliceous glasses contain at least 20 wt % $Al_2O_3$. More preferably, the glass contains $Al_2O_3$ and MgO in a total amount of 25 to 40 wt %.

The refractory oxide matrix applied to the wound package prepared by the present invention is generally a porous substance having a porosity of from about 20 to 70%. The matrix at least partially surrounds the ceramic fibers and any ceramic binder that may be present. The matrix generally provides some integrity to the fiber configuration so that an adequate level of mechanical strength is provided to the wound package. The matrix also provides an excellent degree of thermal shock resistance because of the inability of the porous matrix to transmit high, thermally induced mechanical stresses to the fibers. The matrix must be sufficiently refractory to withstand the intended temperature of use of the wound package. Thus the matrix should have a softening point above about 1000° C., preferably above about 1400° C. and as high as 2000° C.

The matrix is applied to the bonded or unbonded ceramic fibers in the form of a coating composition which is then fired. Although some chemical changes may occur in the matrix coating composition in addition to loss of volatile materials on firing, the final wound package is a mechanically bound composite structure, substantially devoid of chemical binding forces at yarn-/binder/matrix interfaces.

The coating composition from which the refractory matrix can be derived is generally an aqueous solution, suspension, dispersion, slurry, emulsion, or the like which contains particles of one or more oxides or oxide compounds, a precursor of such an oxide or oxide compound or both. The oxides or oxide compounds (e.g., mullite, spinel) have melting points of at least 1000° C., preferably at least 1,600° C., and as high as 2,800° C. or more.

Examples of suitable refractory oxide precursors which can be used in the coating compositions include alumina hydrate, basic aluminum chloracetate, aluminum chloride and magnesium acetate. Coating compositions containing these materials are converted in situ to a refractory oxide or mixture of oxides by firing.

Preferably, 60 to 90% by weight of the refractory oxide matrix is derived from particles of the oxides (or oxide compounds) in the coating composition and 10 to 40% by weight from particles of a refractory oxide precursor. The particles should be less than 20 microns in diameter (and more preferably less than 2 microns) to aid penetration into voids between fibers.

The composition of the coating must be such that fluxing with the binder is avoided at firing and in-use temperatures.

In general, the coating composition can be selected from known ceramic or refractory compositions and cements with the above requirements in mind. Preferably, the coating composition should yield a refractory oxide matrix containing at least 40% by weight of alumina with the other oxides being selected from those of the metals of Group IIA and Group IVB of the Periodic (Table, such as BaO, CaO, MgO, $ZrO_2$ and $TiO_2$.

Preferably, the coating composition is uniformly distributed around the fibers of the yarn. The distribution is affected by the viscosity of the coating composition, the method of application, the density (or tightness) of the yarn bundle, the nature of the yarn and the amount of the coating composition. The composition should have a viscosity that is low enough to permit flow and some penetration into voids in the yarn but high enough to facilitate adhesion to the yarn bundle.

When the yarn contains no refractory oxide precursor fibers, the coating composition is preferably applied in an amount calculated as refractory oxide matrix of 20 to 50% by weight of the final structure, to the yarn before winding the yarn to form the wound package to provide uniform distribution of the coating. The coating compositions which conveniently are aqueous dispersions or solutions can be applied to the yarn in many ways such as immersion of the yarn in a bath, use of a finish roll, spraying, etc. All or part of the coating composition can be applied, if desired, after the wound package has been prepared.

The firing at any stage of the process is determined by the function of that stage.

1. Conversion of Precursor Fibers

When a yarn of refractory precursor oxide fibers is used to form all or part of the wound package, such a yarn requires a relatively low firing temperature (e.g. 350° C. to 800° C.) to remove most volatiles and develop strength. A high firing temperature (e.g., 1300° to 1500° C.) consolidates the fiber and gives it greater strength. This can be done stepwise or in one continuous slow firing.

2. Establishing Bonds from Binder

When a binder in the form of a fiber is plied with the ceramic fiber which forms the wound package, the composite yarn can be fired at a temperature relatively close to the softening or sintering point of the binder fibers to produce partial flow or sintering or at a higher temperature for more complete flow. For example, wound packages of S glass binder fibers and alumina ceramic fibers can be fired at about 1000° C. or 1540° C. to obtain, respectively, the partially melted bond or the completely melted bond. The nature of the glass bonds depends on the type of glass and the firing temperatures used. It is a characteristic of as-spun refractory oxide precursor fibers that they shrink linearly from 15 to 25% upon being heated to about 550° C. Glass fibers generally show no shrinkage at this temperature so that firing below the melting point of the glass causes shrinkage of the precursor and results in a "glass-rich" surface which can improve erosion resistance.

3. Conversion of Coating Composition to Refractory Oxide Matrix

The wound package containing the coating composition is dried and then fired to set the composition and form the matrix. Typical coating compositions require temperatures of from 350° to 900° C. to remove most volatiles and develop crystallinity and strength in the matrix. At these temperatures, precursors in the coating compositions are converted to the corresponding oxides (e.g. alumina). Under some circumstances, e.g. high precursor level in the coating composition, the firing may produce small cracks in the coating composition due to shrinkage. These can be "healed" by applying one or more additional applications of the coating composition to the wound package, with drying and firing between coats. Such additional applications increase the resistance of the wound package to sagging or distortion during high temperature firing, especially when fired unsupported in the vertical position.

It may be desirable to fire the wound package above 900° C. to further increase the strength and crystallinity of the refractory oxide matrix. The maximum temperature should be less than 1200° C. if the wound package contains more than 15 Wt % silica in either fibers or matrix because the silica may start to crystallize to cristobalite at 1200° C. Excess cristobalite is undesirable since cristobalite undergoes a volume change at 200° to 270° C. which contributes to poor thermal shock resistance. The finished articles should contain no more than 15 wt % cristobalite and preferably less than 5 wt %.

Optionally, additional coating composition can be added to the high fired, coated, wound package in an amount sufficient to provide a refractory oxide matrix comprising 5 to 25 wt % of the ultimate product wound package after heating at 900° C. Such ultimate products are good substrates for catalysts.

A preferred yarn uses siliceous glass fibers comprising 61-66 wt % $SiO_2$, 24-26 wt % $Al_2O_3$ and 9-15 wt % MgO. A coating composition consisting essentially of alumina and an alumina precursor is applied to the yarn in an amount sufficient to provide a refractory oxide matrix comprising 27 to 34 wt % of the final wound package product before the yarn is wound to form the wound package. The wound package is dried at about 150° C., heated to about 600° C., held at that temperature for about 45 minutes and cooled. Additional alumina coating composition is applied in an amount to provide a refractory oxide matrix comprising 9-12 wt % of the final wound package product and the wound package product is dried at 150° and then high fired at 900° to 1150° C. in a period of 2, 5 to 8 hours, held at the maximum temperature for ¼ to 24 hours and cooled. Preferably, all of the coating composition is applied before the package is wound to provide a final wound package containing 36 to 46 wt % refractory oxide matrix.

The wound package products of the invention are useful as elevated temperature reactors for exhaust gases and polluting fumes where the gas flows laterally through the porous walls of the wound package product to contact a catalyst supported on the wound package product. Due to the open ends of the pyramids formed by the windings facing both inwardly and outwardly there is a very low pressure drop when passing gases through the wound package product while still providing excellent catalyst efficiency in contacting the gases. The product wound package can be mounted in a reactor such as shown in FIG. 4 of U.S. Pat. No. 4,092,194 for use in treating exhaust gases.

One preferred class of products contains from 40 to 70 wt % ceramic fibers and from 30 to 60 wt % refractory oxide matrix with no binder. Tubes of this type, with alumina fibers and alumina matrix are extremely inert to chemicals and can be used at temperatures approaching the melting point of alumina. However, such wound package products do not have the higher interlaminar strength and shear strength of comparable wound package products containing a binder.

Another preferred class of products, characterized by good erosion resistance, contain 15 to 40 wt % of fused glass as the ceramic fiber binder and 15 to 60 wt % of a refractory oxide catalyst.

The wound package products of the present invention exhibit catalytic activity in conversion of exhaust fumes to (a) oxidize carbon monoxide, hydrocarbons and/or hydrocarbon residues or (b) to reduce nitrogen oxides. This may derive from the catalysts present in the original components of the tube (i.e., ceramic fibers, ceramic binder or refractory oxide matrix) or by addition of catalysts to the final wound package product. The catalyst may be placed on the final wound package product by absorption of a compound of the active component or imbibition of an active material or precursor from a slurry form followed by drying and conversion to the active material.

Suitable catalysts include the noble metals (Ru, Rh, Pd, Cs, Ir and Pt) in elemental or oxide form and oxides, vanadates, chromates, chromites, manganates, manganites, stannates, molybdates, tungstates, niobates or tantalates of Fe, Co, Ni, Cr, Mn, Cu, Zn, Ag and Cd; and the rate earth salts.

I claim:

1. A process for forming a tubular structure for contacting gases having a continuous wall formed of inwardly and outwardly facing pyramids by winding on a rotating mandrel comprising: feeding a yarn from each of two yarn guides spaced from each other in a plane which yarn guides reciprocate in a horizontal direction parallel to the axis of rotation of the mandrel in complete reciprocations; and decreasing the spacing between the yarn guides as the yarns are wound on the mandrels, there being a fixed rational number of revolutions of the mandrel for each complete reciprocation of each yarn guide, said rational number being the same throughout the formation of the tubular structure to form a continuous wall of both outwardly facing pyramids and inwardly facing pyramids to provide a large area for contacting gases.

2. The process of claim 1 wherein the two yarn guides are spaced rom each other substantially in a vertical plane.

3. The process of claim 2 wherein the yarn guides are mounted on a single reciprocating holder.

4. The process of claim 1 wherein the two yarn guides are spaced from each other substantially in a horizontal plane.

5. The process of claim 1 wherein a beginning distance separating the two yarns on the mandrel at the start of winding is a positive whole number multiple of a final distance separating the two yarns at the completion of winding.

6. The process of claim 5 wherein the beginning distance separating the two yarns on the mandrel is twice the final distance separating the two yarns.

7. The process of claim 4 wherein a beginning distance separating the two yarns on the mandrel at the start of winding is a positive whole number multiple of a final distance separating the two yarns at the completion of winding.

8. The process of claim 7 wherein the beginning distance separating the two yarns on the mandrel is twice the final distance separating the two yarns.

* * * * *